(12) United States Patent
Whitmore, Sr. et al.

(10) Patent No.: US 10,266,436 B2
(45) Date of Patent: Apr. 23, 2019

(54) CHEMICAL INJECTOR

(71) Applicant: JCS Industries, Spring, TX (US)

(72) Inventors: Brian S. Whitmore, Sr., Spring, TX (US); James W. Bess, Estero, FL (US); Richard J. Coin, Chardon, OH (US)

( * ) Notice: Subject to any disclaimer, the term of this patent is extended or adjusted under 35 U.S.C. 154(b) by 1084 days.

(21) Appl. No.: 14/492,282

(22) Filed: Sep. 22, 2014

(65) Prior Publication Data

US 2015/0083671 A1 Mar. 26, 2015

Related U.S. Application Data

(60) Provisional application No. 61/880,393, filed on Sep. 20, 2013.

(51) Int. Cl.
| C02F 1/467 | (2006.01) |
|---|---|
| C02F 1/68 | (2006.01) |
| C02F 1/46 | (2006.01) |
| C02F 1/76 | (2006.01) |
| C02F 1/461 | (2006.01) |
| C02F 103/06 | (2006.01) |

(52) U.S. Cl.
CPC ............ *C02F 1/686* (2013.01); *C02F 1/4602* (2013.01); *C02F 1/76* (2013.01); *C02F 2001/46142* (2013.01); *C02F 2103/06* (2013.01); *C02F 2201/4613* (2013.01); *C02F 2303/04* (2013.01)

(58) Field of Classification Search
None
See application file for complete search history.

(56) References Cited

U.S. PATENT DOCUMENTS

| 4,123,800 A | 10/1978 | Mazzei |
|---|---|---|
| 4,605,498 A | 8/1986 | Kulish |
| 4,879,045 A | 11/1989 | Eggerichs |
| 5,743,637 A | 4/1998 | Ogier |
| 5,860,451 A | 1/1999 | Raleigh et al. |
| 5,863,128 A | 1/1999 | Mazzei |
| 6,146,538 A | 11/2000 | Martin |
| 6,173,526 B1 | 1/2001 | Mazzei |
| 6,715,701 B1 | 4/2004 | Julien |
| 7,111,975 B2 | 9/2006 | Fenton et al. |
| 7,125,003 B1 | 10/2006 | Flakner |
| 7,357,565 B2 | 4/2008 | Gopalan et al. |
| 7,731,163 B2 | 6/2010 | Olivier |
| 7,776,275 B2 | 8/2010 | Whitmore, Sr. |
| 7,784,999 B1 | 8/2010 | Lott |

(Continued)

FOREIGN PATENT DOCUMENTS

| KR | 20110047804 A | * | 5/2011 | ............ C02F 1/461 |
| WO | WO 2010028097 A1 | * | 3/2010 | ............ C02F 1/4602 |

OTHER PUBLICATIONS

English machine translation of KR 2011-0047804 (Year: 2011).*

*Primary Examiner* — Michael J Felton
*Assistant Examiner* — Katherine A Will
(74) *Attorney, Agent, or Firm* — Winstead PC

(57) ABSTRACT

A chemical injector includes a body forming a fluid passage extending from an inlet through an outlet, an injection port connected to the fluid passage, an anodic portion of the fluid passage having a first electrical charge and a cathode having a second electrical charge in communication with the fluid passage. The fluid passage may include a constriction such as in an orifice or venturi device.

18 Claims, 4 Drawing Sheets

(56) References Cited

U.S. PATENT DOCUMENTS

| | | |
|---|---|---|
| 7,897,022 B2 | 3/2011 | Simmons et al. |
| 8,157,972 B2 | 4/2012 | Hegel et al. |
| 8,313,701 B2 | 11/2012 | Whitmore, Sr. |
| 8,377,279 B2 | 2/2013 | Jha et al. |
| 2007/0108056 A1 | 5/2007 | Nyberg et al. |
| 2011/0303532 A1* | 12/2011 | Foret ..................... A23B 4/015 204/269 |
| 2012/0111720 A1* | 5/2012 | Kuhnel ............... C02F 1/46109 204/275.1 |
| 2012/0312756 A1* | 12/2012 | Chandler, Jr. ............ C02F 1/42 210/754 |

\* cited by examiner

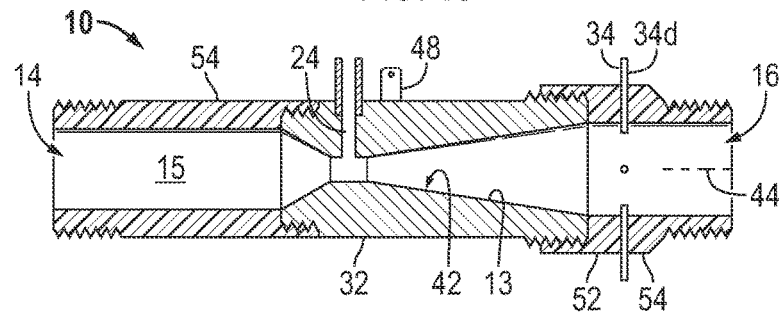
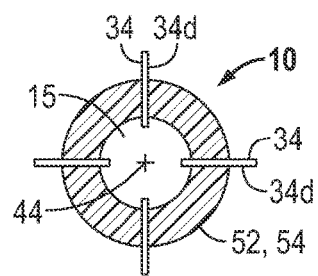
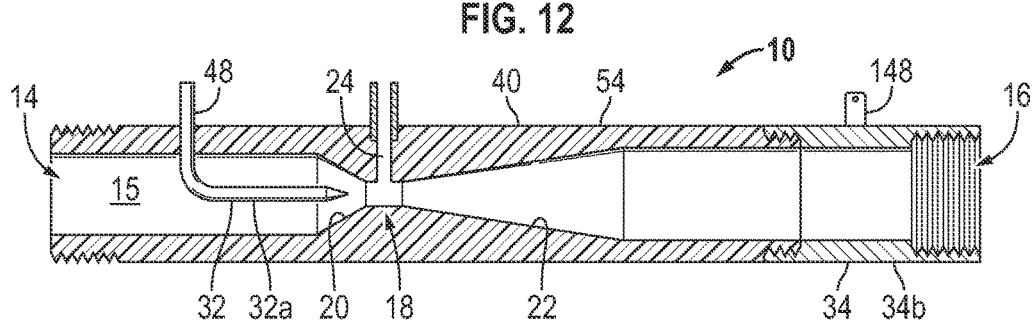

CHEMICAL INJECTOR

BACKGROUND

This section provides background information to facilitate a better understanding of the various aspects of the disclosure. It should be understood that the statements in this section of this document are to be read in this light, and not as admissions of prior art.

Water supply systems that obtain water from underground water tables or from surface waters can have numerous water quality problems. In some areas it is common for the raw water to have high amounts of dissolved calcium and magnesium hardness. In potable water applications it is common to pass some of the well or surface water thru an injector creating a vacuum that draws a solution containing a disinfectant chlorine compound such as sodium hypochlorite into the injector so that it mixes into the water to be treated. Typically the well or surface water has a pH that is near neutral and the hypochlorite solution has a high pH. When the two solutions mix in the injector, the pH of the combined solution is higher than that of the water being treated and calcium/magnesium deposition occurs. The mineral deposition interferes with the performance of the injector and the injector has to be maintained by periodically mechanically cleaning the injector or soaking it in acid.

The hardness compounds can be removed from the well or surface water by ion exchange, distillation or deionization but these methods are expensive and are often not desired for treatment of potable water. Magnetic devices have been proposed for preventing scale in potable water plumbing. However, these devices have not been shown to function in the more severe situations where a high pH solution is mixed with potable water containing high concentrations of calcium and magnesium hardness.

SUMMARY

In accordance to an embodiment of the disclosure a chemical injector includes a body forming a fluid passage extending from an inlet through an outlet, an injection port connected to the fluid passage, an anodic portion of the fluid passage having a first electrical charge and a cathode having a second electrical charge in communication with the fluid passage. A method according to an embodiment of the disclosure includes passing water through the injector and adding or disposing a chemical into the fluid passage through the injection port. The method may include intermittently reversing the polarity of the anodic portion and the cathode.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 10 illustrates a chemical injector incorporating a rod-type cathode extending radially into the fluid passage in accordance to one or more aspects of the disclosure.

FIG. 11 illustrates an end view of the injector of FIG. 10 showing the cathodic element extending radially into the fluid passage in accordance to one or more aspects of the disclosure.

FIG. 12 illustrates a chemical injector incorporating an elongated anode and cathodic coupler element in accordance to one or more aspects of the disclosure.

DETAILED DESCRIPTION

Figure 1:
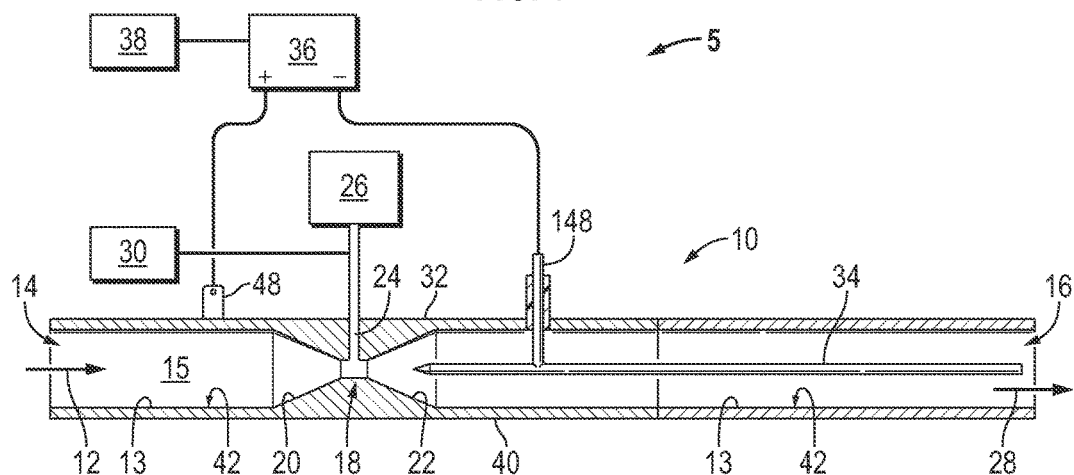
FIG. 1 is a schematic illustration of a fluid treatment system incorporating a chemical injector in accordance to one or more aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

FIG. 1 is a schematic illustration of a fluid treatment system 5 incorporating a chemical injector 10 (e.g., orifice, venturi, eductor) in accordance to one or more embodiments. In accordance with one or more embodiments, the fluid treatment system is utilized to treat water, for example from a subsurface or surface reservoir, with a disinfectant chlorine compound such as sodium hypochlorite. It is recognized however that injector 10 and the methods of utilizing injector 10 are not limited to particular fluid or fluid treatment system.

Injector 10 is hydraulically connected to a motive liquid or liquid stock 12, e.g. water, providing a fluid passage 15 extending from an inlet 14 through an outlet 16. In accordance to some embodiments, chemical injector 10 is an orifice or venturi type injector. The fluid passage 15 includes a throat or constriction 18 coupling inlet 14 and outlet 16. A converging portion 20 narrows down from the diameter of inlet 14 to the diameter of the throat or constriction 18 and an exit funnel or diffuser 22 tapers out from the diameter of the throat or constriction 18 to the diameter of the outlet 16. The inside diameter of the inlet 14 section and the inside diameter of the outlet 16 section may be equal.

A suction or injection port 24 connects the fluid passage 15 to a chemical 26 (e.g., disinfectant, sodium hypochlorite). In the illustrated injection, the injection port 24 is located proximate the constriction 18. As the liquid stock 12 flows through the injector 10 the pressure difference between the inlet 14 and the outlet 16 creates a vacuum which draws chemical 26 through the injection port to mix with the liquid stock 12 which is discharged from the injector as a treated liquid 28. The chemical 26 may be pumped into the injector through injection port 24. Injector 10 is illustrated as having a constriction 18; however, in accordance with aspects of this disclosure injector 10 may not utilize a constriction in the fluid passage 15. A chemical feeder system 30 (for example, flow rate sensor and flow controller) may be operationally connected with injector 10 to control the chemical application rate. Non-limiting examples of chemical feeder systems are disclosed in U.S. Pat. Nos. 7,776,275 and 8,313,701, the teachings of which are incorporated herein by reference.

Injector 10 is an electrically charged device having an anode or anodic element or portion 32 and a cathode or cathodic element or portion 34. The anode 32 and the cathode 34 are connected to an electrical power source 36 via electrical contacts or connectors 48 and 148 and an electrical control circuit 38 may be utilized for example to periodically reverse the polarity of the anode 32 and the cathode 34 for example to clean the cathode of deposited scale (e.g., calcium carbonate).

The body 40 of the injector 10 illustrated in FIG. 1 is the anode portion 32 and the inside diameter or internal surface 13 of fluid passage 15 of the anode portion has a material coating 42. The material coating 42 emits a low pH condition in response to the applied electrical voltage thereby preventing or mitigating deposition of the soluble hardness (e.g., calcium carbonate) on the anodic surface. The anodic portion 32 of body 40 may be constructed of a material such as titanium and the surface of the fluid passage of the anodic portion coated with material coating 42 such as a noble metal, for example gold, platinum, palladium, platinum-iridium, rhodium, ruthenium. These metals are highly reactive catalytic compounds with good germicidal properties, that resist corrosion, and that do not dissolve easily. The coating 42 may be applied for example by plating, sintering, and deposition. The example of anodic materials and coatings are examples and use of other materials of construction does not depart from this disclosure. For example, niobium may be utilized in place of titanium with a material coating such as containing platinum, tantalum iridium, ruthenium, palladium and diamond. In some applications, the anode portion may be constructed of a steel or stainless and with a lead or cadmium coating for hydrogen evolution. In accordance with one or more embodiments, the anodic element or portion 32 is constructed of titanium with a tantalum-iridium coating.

The cathodic element 34 (i.e., cathode) illustrated in FIG. 1 is an elongated element 34a (FIG. 2) which is located in the fluid passage of the outlet portion 16 of the injector and extends in parallel with the longitudinal axis of the fluid passage. The cathode 34 acts as a catalyst attracting the precipitated insoluble minerals. In some embodiments of injector 10, as further described below, the cathodic element is formed by a portion of the injector for example a portion of the fluid passage. Cathodic element 34 may be formed of any suitable metal or conductive ceramic. For example, cathode 34 may be constructed of a pure metal such as nickel and tungsten or a high resistivity alloy such as nicrome or HASTELLOY (registered trademark of Haynes International, Inc.), e.g. a nickel alloy, stainless steel, stainless steel alloys. In accordance to one or more embodiments, the cathodic element or portion 34 may be constructed of HASTELLOY C276.

An example of a method of operation is now disclosed with reference to FIG. 1. Liquid stock 12 is passed, for example pumped, through the fluid passage 15 of injector 10. The pressure drop across the constriction 18 creates a vacuum drawing chemical 26 into fluid passage 15 and mixes with liquid stock 12. An electric current via power source 36 is applied to the anodic element 32 and the cathodic element 34. During forward operation or polarization, the anodic element 32 is connected to the positive lead of the power supply and cathodic element 34 is connected to the negative lead. This imposes a positive potential on the anodic portion of the injector allowing oxygen and acid to be produced on the inner surface of the fluid passage of the injector. The acid helps prevent precipitation of calcium deposits on the critical surfaces of the injector. The power supply imposes a negative potential on the cathodic element 34 so it produces hydrogen and hydroxide. Some calcium will deposit on the cathode but this area is less critical to the function of the injector. Although deposition of precipitates on the cathodic portion may not significantly affect the performance of the injector in the short term, it may be removed periodically by reversing the electrical current and making the anodic portion of the injector negative and the cathodic portion positive.

Figure 2:
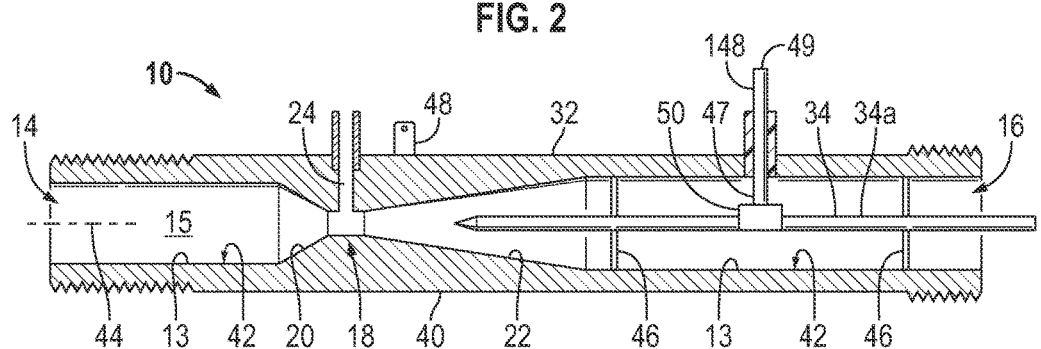
FIG. 2 illustrates a chemical injector incorporating a rod-type cathode disposed downstream of the chemical injection port in accordance to one or more aspects of the disclosure.

Refer now to FIG. 2 illustrating an embodiment of an injector 10 incorporating a cathodic element 34 in the form of an elongated member, e.g., rod or wire, identified specifically with 34a. Similar to FIG. 1, the elongated cathodic element 34a is positioned within the outlet 16 portion of the injector downstream from the chemical injection port 24. In the illustrated examples, cathodic rod element 34a is aligned substantially parallel to the longitudinal axis 44 of the injector and of fluid passage 15. In the illustrated embodiments, the cathodic rod element is centered in fluid passage 15. In these embodiments, the cathodic rod element 34a is centered in the fluid passage by non-conductive (e.g., plastic) members 46, e.g., pins. An electrical connector 148 is connected at a first end 47 to the cathodic rod element 34 in the fluid passage and extends radially through the injector body 40 to a second end 49. With reference to FIG. 1, electrical source 36 is connected to electrical connector 148. The first end 47 may be connected to the cathodic rod element 34a in various manners. For example, a connector 50 such as a nut is utilized in FIG. 2. In accordance to some embodiments, the first end 47 of the electrical connector 148 can be positioned in a hole formed in cathodic rod element 34a and secured by cementing and/or threading.

Figure 3:
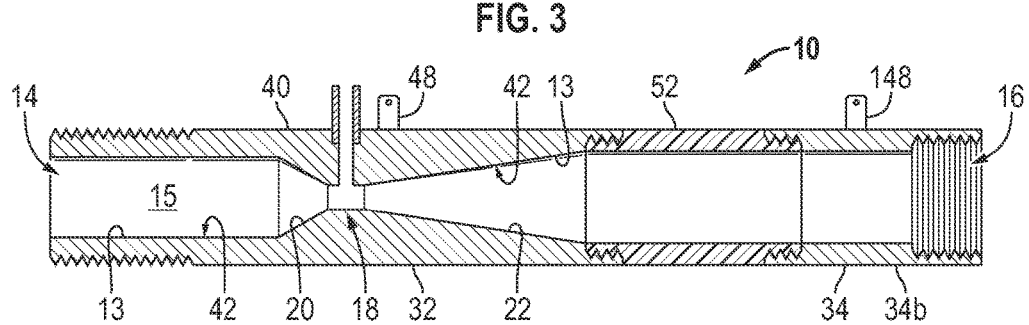
FIGS. 3-7 illustrate chemical injectors incorporating a cathodic element forming a portion of the injector fluid passage in accordance to one or more aspects of the disclosure.

Refer now to FIG. 3 illustrating an injector 10 incorporating a cathodic element 34 forming a portion of the fluid passage 15. The illustrated injector 10 includes an anodic portion 32, which extends from the inlet 14 to a position downstream of constriction 18 and the chemical injection port 24. Cathodic element 34 is formed as a cylindrical element, identified specifically with reference number 34b, that forms a portion of fluid passage 15 along the outlet 16 of injector 10. Cylindrical cathodic element 34b, e.g., coupler, is connected to the anodic portion 32 of the injector body 40 and electrically insulated from anodic portion 32 by an insulator 52. For example, insulator 52 is illustrated in FIG. 3 as a cylindrical coupling interconnecting cylindrical cathodic element 34b and the anodic portion 32 of the injector body. Non-limiting examples of non-conductive materials include plastics such as and without limitation to polyvinyl chloride ("PVC") and chlorinated polyvinyl chloride ("CPVC"). When interconnected each of the members forming fluid passage 15 are considered part of body 40. In the illustrated example, the electrical insulator 52 is illustrated as a coupling or section of pipe, however, it is noted that other types of electrical insulators may be utilized.

As will be understood by those skilled in the art with benefit of this disclosure, cylindrical anodic elements 32 and cylindrical cathodic elements 34b can interconnected in various arrangements to construct a chemical injector 10. Various non-limiting examples are illustrated in FIGS. 3-7 and FIG. 9.

Figure 4:
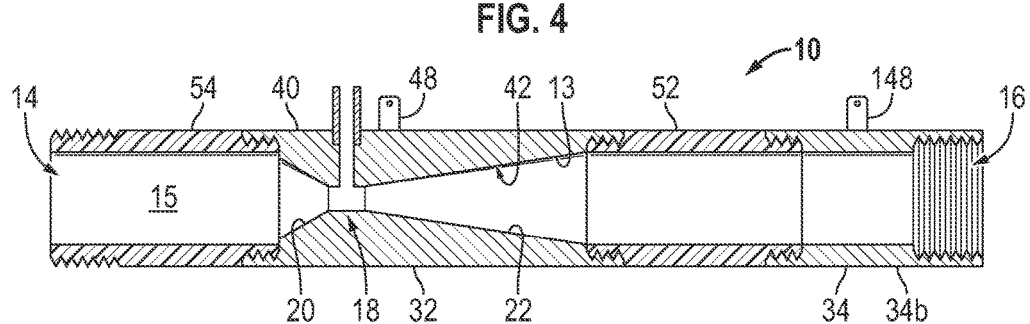

FIG. 4 illustrates an example of a multi-section injector 10 in accordance to one or more aspects of the disclosure. The illustrated injector 10 includes an anodic portion 32 of the injector body 40 that forms converging section 20, constriction 18 and diffuser 22 of fluid passage 15. The outlet section 16 of the injector is constructed of a cylindrical cathodic element 34b connected to anodic portion 32 through an insulator 52. In this example, insulator 52 is a plastic member formed as a coupler for example to threadedly interconnect the anodic portion 32 of the body with the cylindrical cathodic element 34b. In this example, a cylindrical plastic member or portion 54 is utilized to form the inlet 14 of the injector. In this embodiment the cylindrical plastic portion 54 and cylindrical insulator 52 are of the same construction. The plastic material is less expensive and easier to mold or machine than material of construction (e.g., titanium, stainless steel) of the anodic portion 32.

Figure 5:
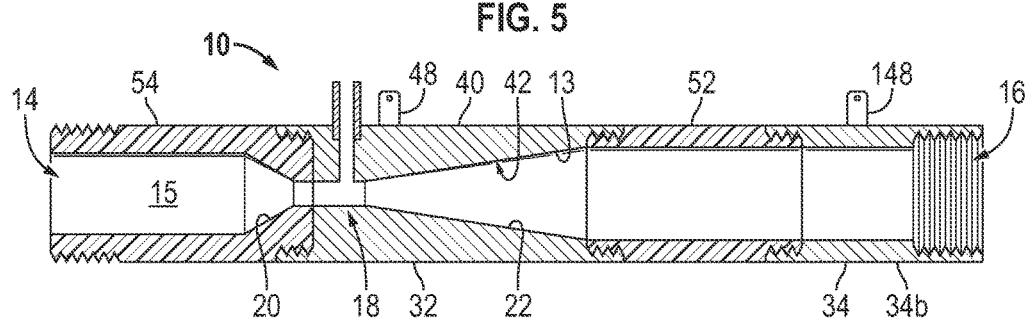
Figure 6:
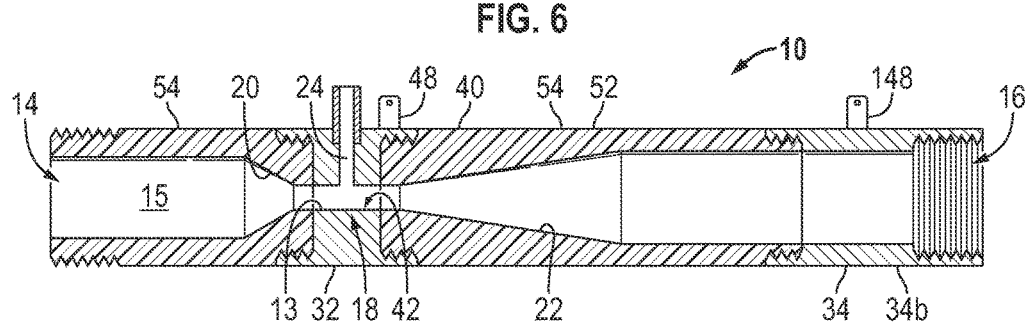
Figure 7:
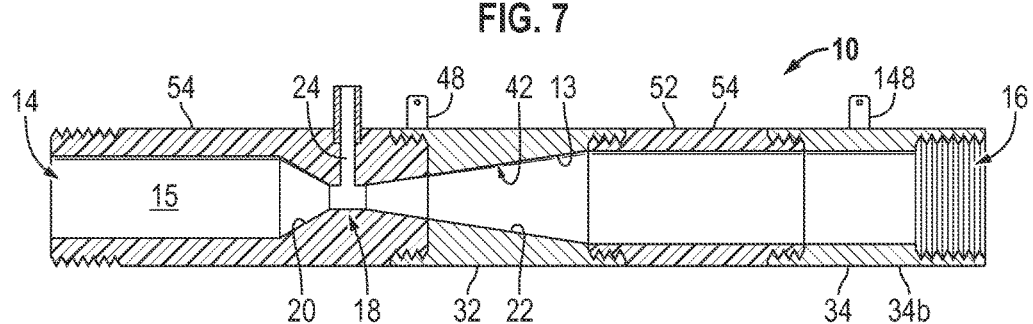

In FIG. 5 the cylindrical plastic portion 54 forms the inlet 14, the converging section 20 and part of the constriction 18. In FIG. 6, the anodic portion 32 forms only a portion of the constriction 18. The upstream portion of the injector 10 in FIG. 6 is formed by plastic portion 54 and the diffuser 22 and a portion of the outlet 16 is formed of the plastic material of insulator member 52 (i.e., cylindrical plastic coupler 54). In FIG. 7 the anodic portion 32 forms diffuser 22 of the fluid passage and a cylindrical cathodic element 34b forms a portion of the outlet 16.

Figure 8:
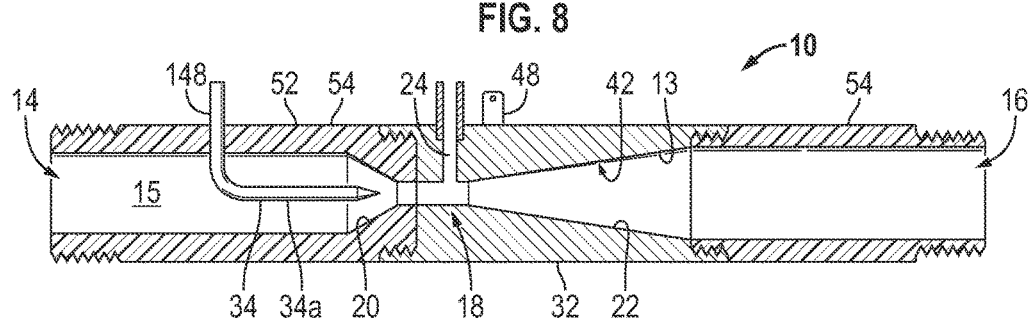
FIG. 8 illustrates a chemical injector incorporating a rod-type cathode disposed upstream of the chemical injection port in accordance to one or more aspects of the disclosure.

FIG. 8 illustrates an injector 10 incorporating an elongated cathodic element 34a that is disposed in the fluid passage 15 upstream of constriction 18. For example, the upstream portion of injector 10 is provided by a plastic portion 54, which is an electrical insulator 52. Cathodic rod element 34a is disposed through plastic portion 54 so as to be disposed in the fluid passage 15 proximate to the constriction 18. The anodic portion 32 of the illustrated injector forms a portion of the constriction 18 and the diffuser 22.

Figure 9:
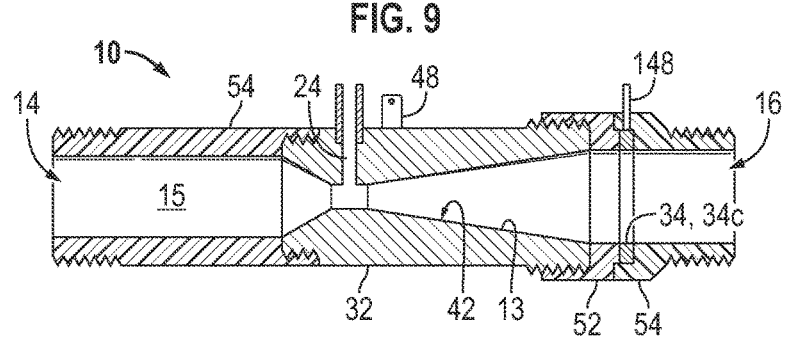
FIG. 9 illustrates a chemical injector incorporating a ring-shaped cathode in accordance to one or more aspects of the disclosure.

FIG. 9 illustrates a chemical injector 10 incorporating a cathode 34 in the form of a ring 34c. Cathodic ring 34c is sized and positioned to form a portion of the fluid passage 15. For example, cathodic ring 34c may be connected within a plastic coupler 54 to connect to an anodic portion 32 of the injector. The plastic portion 54 provides the electrical insulator 52 between the cathodic ring 34c and the anodic portion 32.

FIG. 10 illustrates an injector incorporating a cathodic element 34 in the form of one or more radially extending rods or pins 34d (e.g., wire). FIG. 11 is an end view of the injector of FIG. 10. Illustrated in FIG. 10, the one or more cathodic pins 34d are positioned through an insulating portion 52, 54 (e.g., coupler) so as to extend radially into the fluid passage 15. FIGS. 10 and 11 illustrate the rod or pin shaped cathodes 34d oriented substantially perpendicular to the longitudinal axis 44 of the fluid passage 15.

FIG. 12 illustrates a chemical injector 10 having a plastic injector body 40, 54 connected with a cylindrical cathodic coupler 34, 34b forming a distal portion of the outlet 16. An anode 32 in the form of a rod, identified specifically with reference number 32a, is disposed in the fluid passage 15 upstream of the chemical injection port 24 and the constriction 18.

In an example, water 12, i.e. motive fluid, was flowed through a chemical injector 10 in accordance to FIG. 2. The cathode 34 was a rod type cathode 34a constructed of HASTELLOY C 276 material and the anodic portion 32 of injector body 40 was constructed of Grade 2 titanium with a tantalum-iridium coating. The liquid stock was applied at about five gallons per minute at 60 psig. Sodium hypochlorite was fed through the injector at a rate of 1.5 gallons per hour. The desired chlorine concentration was 3 ppm and the water hardness was 150 ppm. A positive current of 3 amps was applied during forward polarization. During reverse polarization the current was 25 milliamps for 30 minutes. The injector 10 met the desired chlorine concentration during a two week test.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A chemical injector, comprising:
 a body having an internal surface forming a fluid passage extending from an inlet through an outlet, wherein the fluid passage comprises a constriction between the inlet and the outlet;
 an injection port connected to the fluid passage, wherein the injection port is positioned adjacent the constriction;
 an anode portion of the body having an anodic internal surface encircling the fluid passage, the anodic internal surface configured to produce a first condition in response to a first electrical polarity; and
 a cathode in communication with the fluid passage.

2. The injector of claim 1, wherein the cathode is positioned downstream of the injection port.

3. The injector of claim 1, wherein the cathode is positioned upstream of the injection port.

4. The injector of claim 1, wherein the cathode is a rod-shaped member disposed in the fluid passage.

5. The injector of claim 1, wherein the cathode is a portion of the body.

6. The injector of claim 1, wherein the anode portion comprises titanium and a noble metal coating the anodic internal surface.

7. The injector of claim 1, wherein the anode portion extends from the inlet to the outlet and wherein the cathode is disposed in the fluid passage.

8. The injector of claim 1, wherein the first condition is an acidic condition.

9. The injector of claim 1, wherein the anode portion of the body forms the constriction.

10. The injector of claim 1, wherein the anode portion of the body is positioned downstream of the constriction.

11. A water treatment system, comprising:
an injector in communication with a liquid stock, the injector comprising:
a body having an internal surface forming a fluid passage extending from an inlet through an outlet;
an injection port connected to the fluid passage;
an anode portion of the body having an anodic internal surface encircling the fluid passage, the anodic internal surface configured to produce a first condition in response to a first electrical polarity; and
a cathode in communication with the fluid passage;
wherein the body forms a constriction in the fluid passage between the inlet and outlet; and
the injection port is positioned adjacent to the constriction; and
a water treatment chemical in communication with the injection port.

12. The system of claim 11, wherein the first condition is an acidic condition.

13. A method, comprising:
flowing water through a fluid passage of an injector, the injector comprising a body having an internal surface forming the fluid passage extending from an inlet to an outlet, a chemical injection port formed through the body into the fluid passage, and an anode portion of the body having an anodic internal surface encircling the fluid passage, wherein the passage comprises a constriction between the inlet and outlet and the injection port is positioned adjacent to the constriction;
disposing a water treatment chemical through the injection port into the fluid passage;
applying a first electrical polarity to the anodic internal surface and to a cathode in communication with the fluid passage; and
producing a first condition on the anodic internal surface in response to applying the first electrical polarity.

14. The method of claim 13, wherein the cathode is a rod-shaped member disposed in the fluid passage.

15. The method of claim 13, wherein the cathode is a portion of the body.

16. The method of claim 13, wherein the anode portion comprises titanium and a noble metal coating the anodic internal surface.

17. The method of claim 13, wherein the first condition is an acidic condition.

18. The method of claim 13, wherein the first condition mitigates deposition of carbonates on the anodic internal surface.

\* \* \* \* \*